Jan. 24, 1961

J. J. KNOPOW 2,968,987

METHOD AND APPARATUS FOR MEASURING DEPTHS OF WATER AND
DETECTING SUBMERGED BODIES BY EMPLOYING PULSED LIGHT

Filed June 1, 1949

Inventor
JOSEPH J. KNOPOW

By F.J.Schmitt
Attorney

United States Patent Office 2,968,987
Patented Jan. 24, 1961

2,968,987

METHOD AND APPARATUS FOR MEASURING DEPTHS OF WATER AND DETECTING SUBMERGED BODIES BY EMPLOYING PULSED LIGHT

Joseph J. Knopow, 3437 24th St. N.W., Washington, D.C.

Filed June 1, 1949, Ser. No. 96,608

10 Claims. (Cl. 88—1)

(Granted under Title 35, U.S. Code (1952), sec. 266)

The present invention relates to a method and apparatus for detecting objects by use of pulsed light, and more particularly to a pulsed light detection method and apparatus in which the light absorbing properties of the surface of the object to be detected are utilized.

The invention is particularly applicable to the measurement of depths of water and the detection of objects submerged in water, such as submarines. In the prior art systems for the detection of submarines submerged in water, the efforts were directed toward either the actual observation of the submarine's silhouette or the detection of the light intensity reflected from the surface of the submarine.

In the former method, a large loss, in addition to absorption, is introduced by the light being scattered in the water. Furthermore, this scattering of the light creates an illuminated background for the submarine thereby greatly decreasing the visibility of the silhouette. As for the reflection system, it has been determined by actual tests that, generally speaking, the reflectivity of a submarine is very low, except for possibly the reflectivity of some bright objects mounted thereon, and, consequently, the amount of reflected light received is below the level of usefulness.

According to the present invention, a pulsed light detecting system is employed in which the absorbing properties of the target surface is utilized rather than its reflecting properties, and the scattering phenomena are used to advantage rather than tolerated as a loss. Thus, the invention contemplates a transmitter capable of emitting an intense pulse of light to be directed down into the water, and a receiver, rendered operable at the instant the entire pulse of light is in the water, for receiving a steadily decreasing light intensity due to the direct light and the illumination of the scattering haze produced by the light pulse as it increases in depth.

In the absence of a target, the direct and scattered light received, as observed along the same path that the light pulse traveled into the water, decreases smoothly in an exponential manner. However, if a target is intercepted by the descending light pulse, the light will be absorbed by the relatively non-reflecting target surface and, consequently, the light observed by the receiver will drop sharply.

Two phenomena take place as a relatively non-reflective target is intercepted. First, since the light observed is a function of the length of the pulse, the initial light observed will be decreased considerably from what it was with no target present. Secondly, as the pulse of light descends into the water, the leading edge will be fixed in depth by the intercepted target, but the trailing edge will continue down into the water resulting in a further shortening of the pulse and an abrupt elimination thereof as the trailing edge reaches the target. It is this abrupt decrease and premature elimination of the light, rather than the presence of light as used in the earlier systems, that indicates the presence of the target.

To indicate this deviation, a signal having a decay characteristic identical with that of the ideal received signal is combined with the actual received signal, and the resulting differential output represents the position and the distance of the detected object from the source.

Accordingly, an object of the present invention is the provision of a method and apparatus for detecting submerged objects in great depths of water.

Another object is to provide a method and apparatus for quickly and accurately measuring water depths.

A further object is to provide a pulsed light detection system utilizing the light absorbing properties of the surface of the object to be detected, rather than the light reflecting properties.

Still another object of this invention is the provision of a pulsed light detection system employing as a part thereof the scattering of light in water.

A still further object is to provide a pulsed light detection system employing the null method in accurately detecting and ranging the targets selected.

Other objects and advantages of the invention will hereinafter become more fully apparent from the following description of the annexed drawings, which illustrate a preferred embodiment, and wherein.

Figure 1:
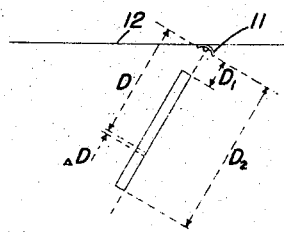
Fig. 1 illustrates diagrammatically the theory of operation of the present invention.

Referring now to the drawings, there is shown in Fig. 1 a light source 11 positioned at the surface 12 of a body of water and arranged to emit pulses of light directed downwardly into the water. The illumination of a section ΔD of the water at a depth D below the surface thereof due to source 11 may be written as:

$$\Delta I'' = \frac{I_s}{D^2} e^{-(\alpha+\beta)D} \quad (1)$$

where $I_s$ is the total illumination from light source 11 just under surface 12, $\alpha$ is the absorption factor of the water, and $\beta$ is the scattering factor.

Inasmuch as the illumination scattered in the upward direction in deep sea water or clear coastal waters, is approximately 13% of the total illumination at a point, the amount of light propagated in the upward direction due to the illumination of ΔD is:

$$\Delta I' = \frac{.13 I_s}{D^2} e^{-(\alpha+\beta)D} \quad (2)$$

This propagated light undergoes a loss due to absorption, $\alpha$, and also one due to scattering, $\beta$. However, as the receiving apparatus is to be positioned at the surface in substantially direct alignment with source 11, the scattering of light will be observed and utilized by this apparatus and, therefore, cannot be considered as a complete loss. The illumination at the surface due to the light at ΔD, as observed by the receiving apparatus, is approximately:

$$\Delta I = \frac{\Delta I'}{D^2} e^{-\alpha D} \quad (3)$$

where ΔI′ is given by Equation 2.

Therefore, the illumination at the surface is:

$$\Delta I = \frac{.13 I_s}{D^2} e^{-(\alpha+\beta)D} \times \frac{1}{D^2} e^{-\alpha D}$$

or $$\Delta I = \frac{.13 I_s}{D^4} e^{-(2\alpha+\beta)D} \quad (4)$$

For light of a wavelength $\lambda = 550\mu\mu$, and in deep sea or clear coastal water, it may be assumed that $\alpha$ is approximately equal to $\beta$. (See Journal of the Optical Society of America, Nov. 1945, page 700.) In some instances of shallow non-clear waters, a deviation from this approximation may arise in that, although the total attenuation factor $(\alpha+\beta)$ may increase, the scattering coefficient $(\beta)$ may become less than the absorption coefficient $(\alpha)$. In these instances, a slight error may be introduced, this error being in such a direction as to indicate a slightly larger detection range than actually exists. This error will not exist for deep sea or clear coastal waters, and applying this assumption to Equation 4, results in:

$$\Delta I = \frac{.13 I_s}{D^4} e^{-3\beta D} \quad (5)$$

The value of illumination expressed by Equation 5 is for a pulse length of $\Delta D$ at a depth $D$ from the surface. The total illumination, therefore, due to a pulse of light the length of which is represented by $D_2 - D_1$ in Fig. 1 is:

$$I = .13 I_s \int_{D_2}^{D_1} \frac{1}{D^4} e^{-3\beta D} dD \quad (6)$$

Upon integration of Equation 6 the following series is obtained:

$$I = .13 I_s \Bigg[ \frac{-1}{3D^3} e^{-3\beta D} + \frac{\beta}{2D^2} e^{-3\beta D} - \frac{3\beta^2}{2D} e^{-3\beta D} - \frac{9\beta^3}{2} \log_e D$$

$$+ \frac{27}{2} \beta^4 D - \frac{81}{8} \beta^5 D^2 + \frac{243}{36} \beta^6 D^3 - \frac{729}{192} \beta^7 D^4 + \ldots \Bigg]_{D_2}^{D_1} \quad (7)$$

Substituting in Equation 7 a value of $50 \times 10^6$ candle power for $I_s$, a value of 0.021 per meter for $\beta$ (this value of $\beta$ is equal to one half the total attenuation factor for deep sea water), and various values of $D_1$ and $D_2$, the corresponding values for light intensity at the receiver, after returning from various depths, are obtained.

Figure 4:
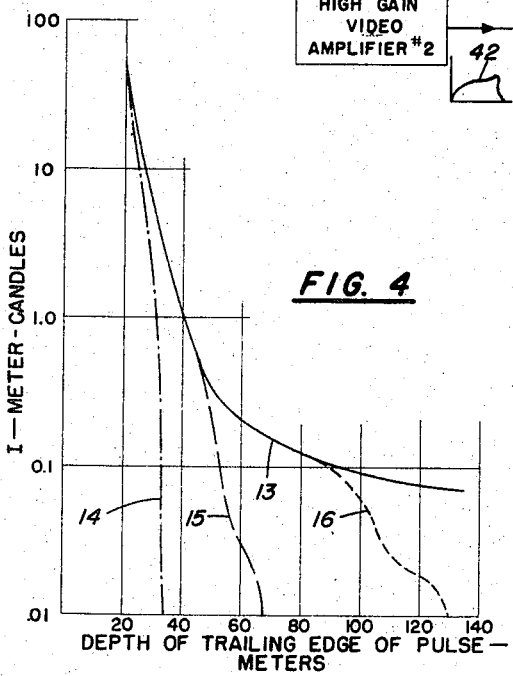
Fig. 4 is a graphical representation of the received signal with no target present and with a target at various points.

Referring now to Fig. 4, there are shown a series of curves obtained from Equation 7, these curves being calculated for a pulse length of approximately 0.5 microsecond. For this pulse length, the value of $D_2$, the depth of the leading edge of the light pulse, will be equal to $D_1$, the depth of the trailing edge, plus 100 meters. Curve 13, which represents the "no target" or reference curve, was obtained by assuming that no shortening of the pulse occurs due to the absorption by a target, and that, therefore, $D_2$ was always equal to $D_1 + 100$ meters.

Curve 14 represents the received signal when a target is intercepted at a depth of 33 meters. Thus, when the trailing edge of the pulse of light is at a depth of 33 meters, under this condition, the entire pulse is absorbed and no signal is received, as indicated by the curve. In calculating curve 14, it is obvious that the value of $D_2$ remains constant at 33 meters and that the target begins to absorb a portion of the light almost immediately, as indicated by the deviation of curve 14 from no target curve 13.

Curves 15 and 16 have been calculated for targets at depths of 67 and 133 meters, respectively, it being seen that these curves begin to deviate from no target curve 13 at greater depths than curve 14. According to the present invention, it is these deviations from the no target curve 13 that are employed to indicate the presence of a target.

Figure 2:
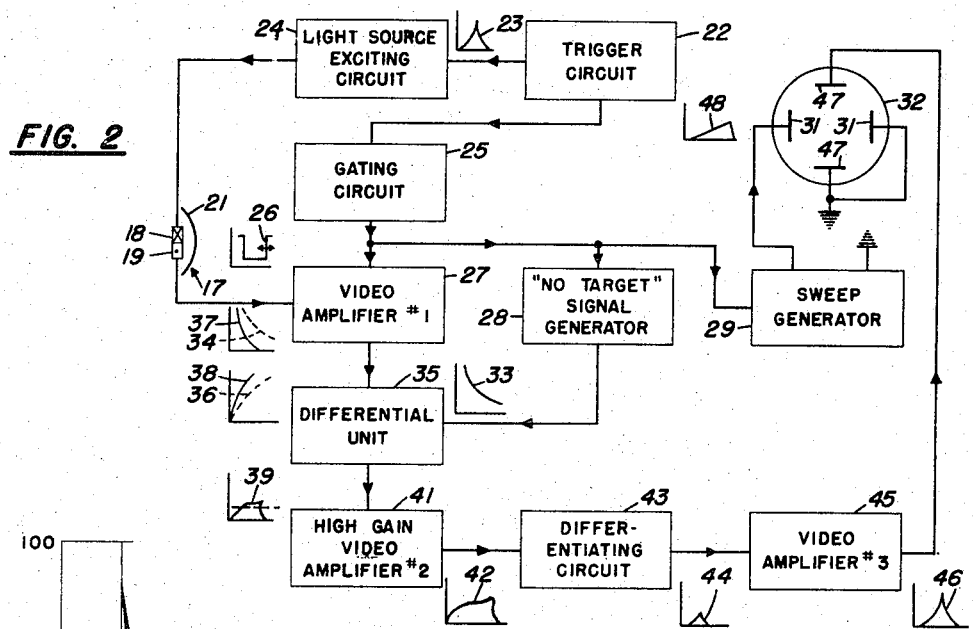
Fig. 2 is a schematic diagram of one form of pulsed light detection system according to this invention.

Referring now to Fig. 2, there is shown a schematic diagram of a preferred embodiment of the present invention comprising a transmitter-receiver unit 17 which includes a source of light 18 and a photo-electric receiver 19, both source 18 and receiver 19 being mounted at the focal point of a reflecting mirror 21 which is arranged for scanning a circular pattern, or any other desired pattern.

Source 18 must be capable of emitting an intense pulse of light, preferably predominant in the vicinity of the green portion of the spectrum, because of its transmission characteristics in sea water. The length of the pulse may vary between 0.5 and 2.0 microseconds, the greater the depth, the larger the pulse length. Source 18 is preferably of the condenser discharge type, it being understood, however, that other sources, such as the exploding wire type arranged to give continuous pulse operation, may be utilized.

Receiver 19 will be required not only to have a very high sensitivity, but also to indicate extremely rapid changes in illumination. One example of a suitable receiving unit would be a modified thallous sulfide photoelectric cell.

A trigger circuit 22, arranged to generate trigger pulses of the type shown at 23, has its output end connected to a light source exciting circuit 24, the pulses from circuit 22 actuating circuit 24 to thereby render source 18 operative. The output of trigger circuit 22 is also connected to the input of gating circuit 25 for producing a gating pulse 26, the duration of which is the time necessary to permit the entire light pulse from source 18 to be submerged in the water.

Gating pulse 26 controls the operation of three circuits, a video amplifier 27, a no target signal generator 28, and a sweep generator 29 for one set of plates 31 of cathode ray indicator 32. Upon application of pulse 26, generator 28 becomes operative and generates a pulse signal 33 having a decay characteristic identical with the decay characteristic of the signal 34 received at the output of receiving unit 19 with no target present. Generator 28 may be any suitable device for producing a pulse having an exponential decay, and in its simplest form could be a condenser-resistor discharge, it being understood that at least one of the elements of generator 28 is made variable to permit the decay characteristic to be altered to accommodate waters with different absorption coefficients.

The output of generator 28 is supplied to one set of input terminals of a differential unit 35, the other set of input terminals being connected to the output end of amplifier 27 which amplifies the output of receiving unit 19. Differential unit 35 is merely an adding or subtracting circuit, one example of which is shown in Fig. 2 of U.S. Patent Number 2,433,237 issued December 23, 1947 to J. A. Rajchman et al., and is so arranged that, if no target is intercepted by the light pulse, the gradual increase of the output signal 36 of amplifier 27 is matched by the gradual decrease of signal 33, and the output of unit 35, which is equal to the sum of the input signals, is, therefore, relatively constant. On the other hand, if a target is intercepted by the light pulse with a resultant abrupt drop and cessation of the receiving unit output signal, as indicated at 37, the output 38 of amplifier 27 does not match signal 33, and a differential voltage signal 39 is produced.

Signal 39 is amplified by a second video amplifier 41 whose output signal is of the form shown at 42, output signal 42 being fed to a differentiating circuit 43, the output signal 44 of which is amplified by video amplifier 45 to produce a signal 46 which is supplied to plates 47 of indicator 32.

Figure 3:
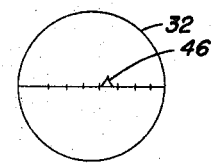
Fig. 3 is a front elevational view of the indicator of Fig. 1 illustrating the presentation of the targets thereon.

Sweep generator 29 is of conventional design and supplies a sweep voltage 48 to plates 31 of indicator 32, and since generator 29 is rendered operable by gating pulse 26, it is readily apparent that signal 46 will appear on indicator 32 in timed relationship, as indicated in Fig. 3. Thus, by arranging circuit 43 and amplifier 45 to be responsive to abrupt changes in signal 42, indicated at the trailing edge thereof, and by calibrating indicator 32 in terms of distance, an accurate indication of the depth of the intercepted target may be obtained.

In operation, the output 33 of generator 28 is adjusted so that the output of differential unit 35 remains constant when it is known that the area being searched contains no target. For determining depth, an area of known depth may be chosen, and the position of signal 46 on indicator 32 noted. Other measurments of depth are then calibrated in terms of the known depth.

The preceding discussion has been considering the source as being positioned just under the water surface, that is mounted on a ship. Now, it is clear that the system proposed by the present invention is also capable of use and installation in an aircraft, and usable from air to water. It is clear that, although the maximum depth capable of detection will be decreased, the system may be satisfactorily utilized in aircraft for detection of submarines, particularly at snorkel or periscope depths.

By arranging the gating pulse to introduce sufficient delay to maintain the receiving apparatus inoperative until the entire light pulse is in the water, the water surface reflection due to the pulse will not be indicated. However, the problem of wave action remains, since these waves will not only introduce a source of varying losses due to reflection, but, in addition, will tend to scan the area under water because of the varying angle of incidence of the light pulses, with the result that, if a target is intercepted, its presence will be indicated but its exact location with respect to the aircraft will not be known.

For detecting snorkeling submarines, however, where the depths will be of the order of 50 feet, the losses of light due to reflection caused by varying angles of incidence will probably not be too serious. Furthermore, by sending out approximately 50 pulses per second from the aircraft, although many pulses will suffer great losses in reflection, enough light pulses will probably reach the target with sufficient intensity for effective operation.

It is apparent that the present invention is capable of use apart from the detection of submarines and the measurement of depths of water. Thus, the invention may be utilized to detect schools of fish or to determine the position of salvage. Furthermore, it is apparent that apparatus different from that specifically described may be utilized to accomplish the purposes of the present invention. Thus, the received signal might be indicated directly, rather than by the employment of the null method, but the latter method is preferred, since very slight deviations may be readily detected and since it may be difficult to design a receiver for directly indicating the received signal. Again, it is apparent that differential unit 35 may be designed to indicate the difference of the two input signals, rather than the sum, without departing from the scope of the present invention.

Accordingly, it is to be understood, that, within the scope of the appended claims, the invention is not limited to the specific embodiment described.

The invention described herein may be manufactured and used by or for the Government of the United States of America for governmental purposes without the payment of any royalties thereon or therefor.

What is claimed is:

1. A system for detecting objects submerged in water comprising a source of light pulses, means for directing said pulses downwardly into the water; light responsive means immediately adjacent said source for receiving the diminishing illumination propagated upwardly due to scattering and absorption as each pulse proceeds downwardly, said receiving means being operative to convert the diminishing illumination received into a corresponding electrical signal, a second signal producing means operative to produce a second electrical signal having a characteristic identical to that of the signal produced by said receiving means when there is no object present, means for combining the outputs of said receiving and producing means to produce a signal which varies only when an object is present, said variation being proportional to the distance between said object and said source, and indicating means responsive to said last mentioned signal.

2. A system according to claim 1, and means for rendering said receiving and said combining means inoperable until the entire light pulse is in the water.

3. In a system for measuring the distance between a pair of spaced objects, one of which is positioned beneath the surface of a body of water, the combination comprising: a source of light pulses on the second object; means for directing said pulses away from said source and into the water; light responsive means immediately adjacent said source for receiving the diminishing illumination directed toward said source due to scattering and absorption as each of said pulses proceeds away from said source, said receiving means being operative to convert the diminishing illumination received into a corresponding electrical signal; a second signal generating means operative to produce a second electrical signal having a characteristic identical to that of the signal produced by said receiving means when there is no other object present; and means for combining the signals from said receiving means and said generating means into a single signal which varies only when another object is present and to an extent proportional to the distance between said spaced objects.

4. In a system for measuring the distance between a first object spaced from a second light absorbing object when both objects are present in at least one fluid medium; a light transmitter carried by the first object and arranged to transmit a pulse of light directed through a part of the fluid medium and upon the second object, a receiver adjacent said transmitter rendered operable at the instant that the entire pulse of light is in the fluid medium for receiving the illumination reflected toward said receiver as the pulse moves into the medium and away from the transmitter, said illumination gradually decreasing in intensity due to scattering and absorption by said medium and to the increasing distance of the pulse from the transmitter, until the pulse contacts and is absorbed by the second object resulting in an accelerated decrease in the intensity of illumination, and means for converting the illumination received into a corresponding electrical signal, which by its character indicates the distance between said objects.

5. In a system for measuring the distance between a first object spaced from a second light absorbing object when both objects are present in at least one fluid medium; a light transmitter carried by the first object and arranged to transmit a pulse of light directed through a part of the fluid medium and upon the second object, a receiver adjacent said transmitter rendered operable at the instant that the entire pulse of light is in the fluid medium for receiving the illumination reflected toward said receiver as the pulse moves into the medium and away from the transmitter, said illumination gradually decreasing in intensity due to scattering and absorption by said medium and to the increasing distance of the pulse from the transmitter, until the pulse contacts and is absorbed by the second object resulting in an accelerated decrease in the intensity of illumination, means for converting the illumination received into a corresponding electrical signal, means for producing a second electrical signal having a characteristic identical to that of the output of said receiver in the absence of a second object, means for combining the outputs of said producing means and said receiver to produce a signal proportional to the distance between said objects, the proportional signal thereby being dependent directly upon the rate of decay of the first mentioned electrical signal as compared to the rate of decay of said second signal, and means for indicating said proportional signal.

6. In a system for measuring the distance between a first object spaced from a second light absorbing object when both objects are present in a fluid medium; a light transmitter carried by the first object and arranged to transmit a pulse of light directed through the fluid medium and upon the second object, a receiver adjacent said transmitter for receiving the illumination reflected toward said receiver as the pulse moves through the medium and away from the transmitter, said illumination gradually decreasing in intensity due to scattering and absorption by said medium and to the increasing distance of the pulse from the transmitter, until the pulse contacts and is absorbed by the second object resulting in an accelerated decrease in the intensity of illumination, and means for converting the illumination received into a corresponding electrical signal, which by its character indicates the distance between said objects.

7. In a system for measuring the distance between a first object spaced from a second light absorbing object when both objects are present in a fluid medium; a light transmitter carried by the first object and arranged to transmit a pulse of light directed through the fluid medium and upon the second object, a receiver adjacent said transmitter for reciving the illumination reflected toward said receiver as the pulse moves through the medium and away from the transmitter, said illumination gradually decreasing in intensity due to scattering and absorption by said medium and to the increasing distance of the pulse from the transmitter, until the pulse contacts and is absorbed by the second object resulting in an accelerated decrease in the intensity of illumination, means for converting the illumination received into a corresponding electrical signal, means for producing a second electrical signal having a characteristic identical to that of the output of said receiver in the absence of a second object, means for combining the outputs of said producing means and said receiver to produce a signal proportional to the distance between said objects, the proportional signal thereby being dependent directly upon the rate of decay of the first mentioned electrical signal as compared to the rate of decay of said second signal, and means for indicating said proportional signal.

8. The method of indicating the distance of a light adsorbing object positioned beneath the surface of a body of water, comprising the steps of propagating light pulses through the water toward the object, receiving the diminishing illumination propagated in the upward direction from each of the pulses, converting the received diminishing illumination into a corresponding electrical signal, and indicating the distance as a function of the rate of decay of the electrical signal.

9. The method of indicating the distance of an object positioned beneath the surface of a body of water, comprising the steps of transmitting light pulses downwardly through the water, receiving the diminishing illumination propagated in the upward direction from each of the pulses as it travels downwardly, converting the received illumination into a corresponding electrical signal, combining the signal with another signal having the characteristic of that of the signal which would have been received had no object been present, and indicating the distance as a function of the combined signal.

10. The method of measuring the distance of an object positioned below the surface of a body of water, comprising the steps of radiating light pulses downwardly through the water toward the object, receiving the diminishing light energy propagated in the upward direction from each of the pulses as it travels downwardly, converting the received energy into a corresponding electrical signal, combining the signal with another signal having a decay characteristic identical with that which would be received with no object present, differentiating the combined signal, and indicating the distance as a function of the differentiated signal.

References Cited in the file of this patent

UNITED STATES PATENTS

| | | |
|---|---|---|
| 1,982,271 | Turner | Nov. 27, 1934 |
| 2,075,808 | Fliess | Apr. 6, 1937 |
| 2,154,374 | Byram | Apr. 11, 1939 |
| 2,165,214 | Blau et al. | July 11, 1939 |
| 2,198,971 | Neufeld | Apr. 30, 1940 |
| 2,237,193 | Mobsby | Apr. 1, 1941 |
| 2,250,333 | Miller | July 22, 1941 |
| 2,268,643 | Crosby | Jan. 6, 1942 |
| 2,277,692 | Dunmore | Mar. 31, 1942 |
| 2,399,426 | Bradley | Apr. 30, 1946 |
| 2,409,030 | Fraenckel et al. | Oct. 8, 1946 |

OTHER REFERENCES

J.O.S.A., vol. 35, 1945, pages 700–705, article by Hulbert, publ. Am. Inst. of Physics, 57 East 55th St., New York city 22, New York.

J.O.S.A., vol. 36, 1946, page 359, article No. 40.

Bulletin of the Am. Meteorological Soc., vol. 21, Dec. 1940, pages 391–396, article by Brodburg et al.